Jan. 26, 1937.  P. N. VOWLES  2,068,881
MECHANISM FOR SPECIALLY FORMING, AND FOR FITTING RELEASING MEANS
OF WIRE TO, BOTTLE CLOSURE CAPS OF THE CROWN SEAL VARIETY
Filed Dec. 5, 1934  11 Sheets-Sheet 1

P. N. Vowles
INVENTOR

By: Glascock Downing & Seebold
Attys.

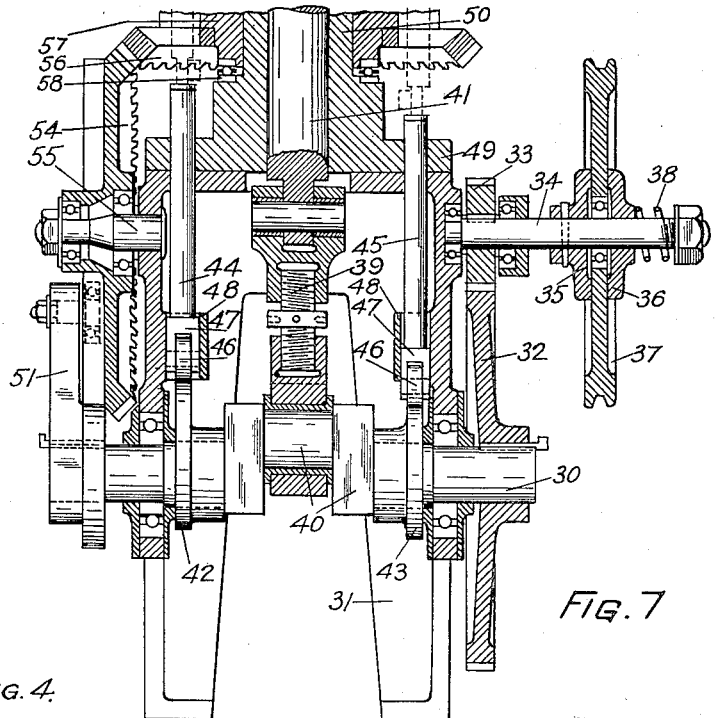
FIG. 7
FIG. 4.
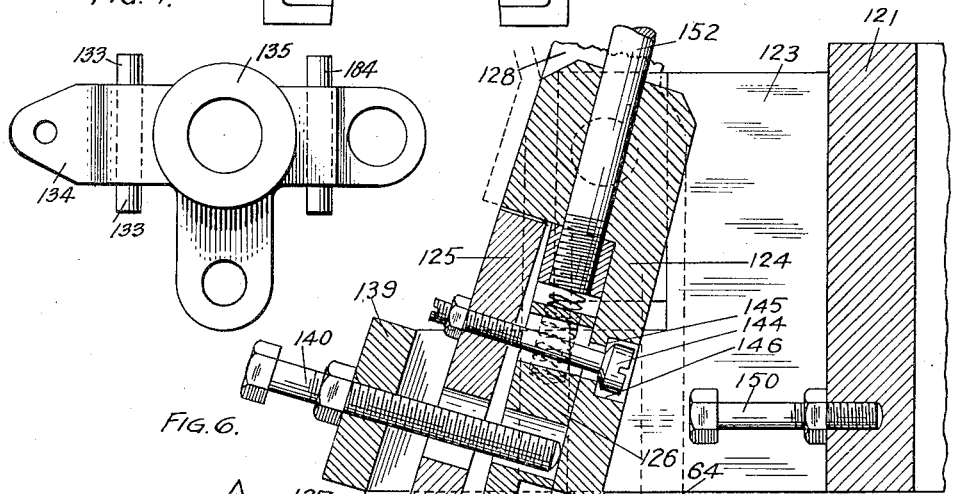
FIG. 6.
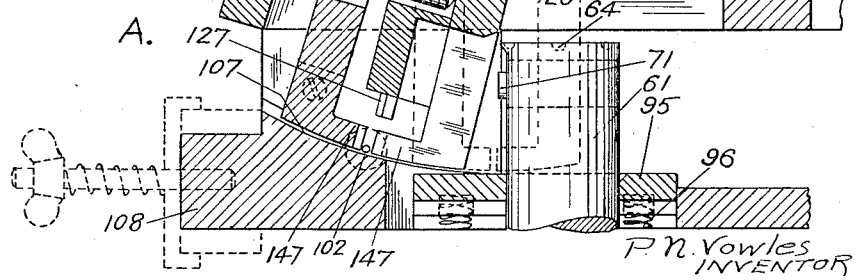

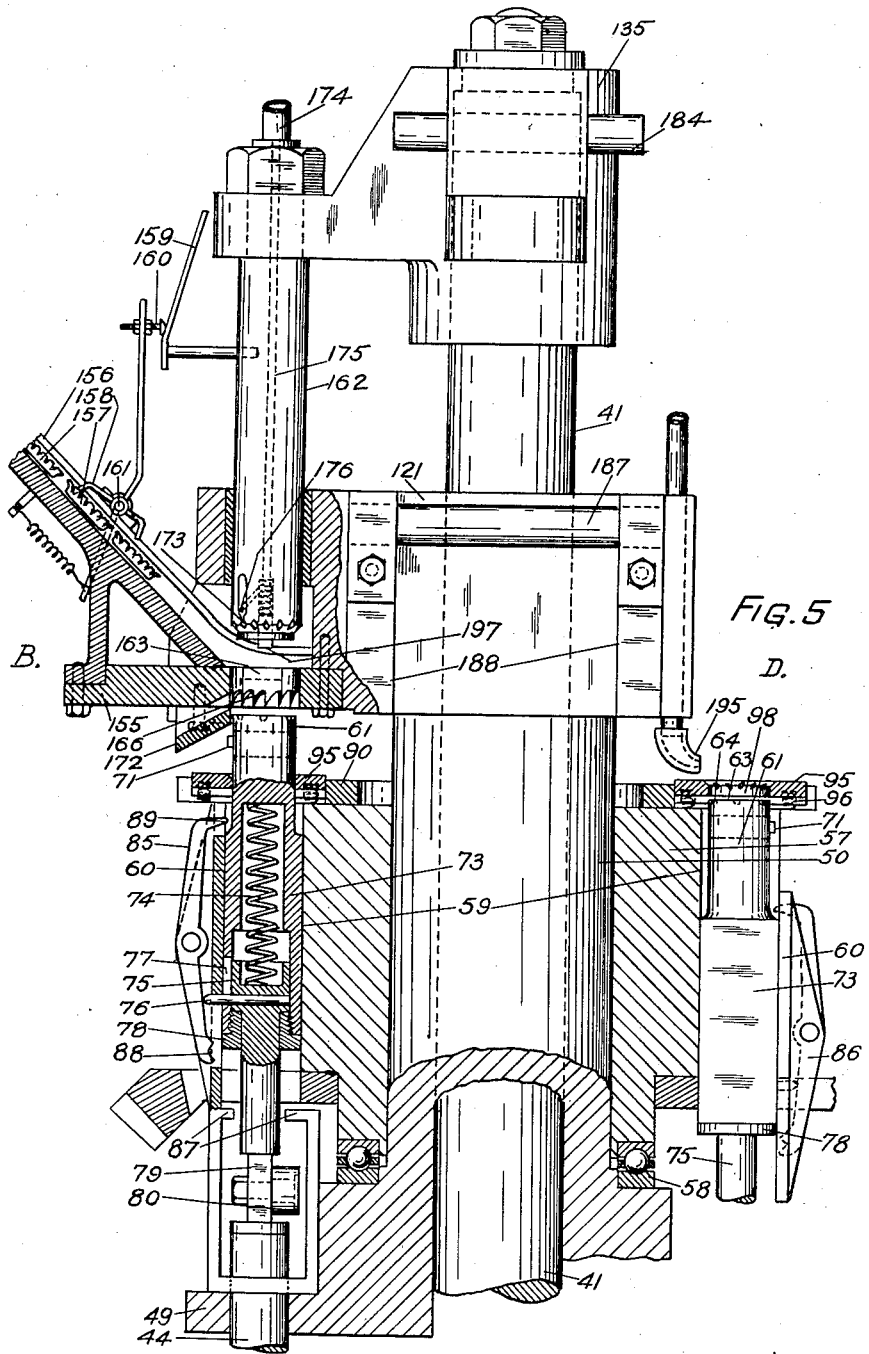

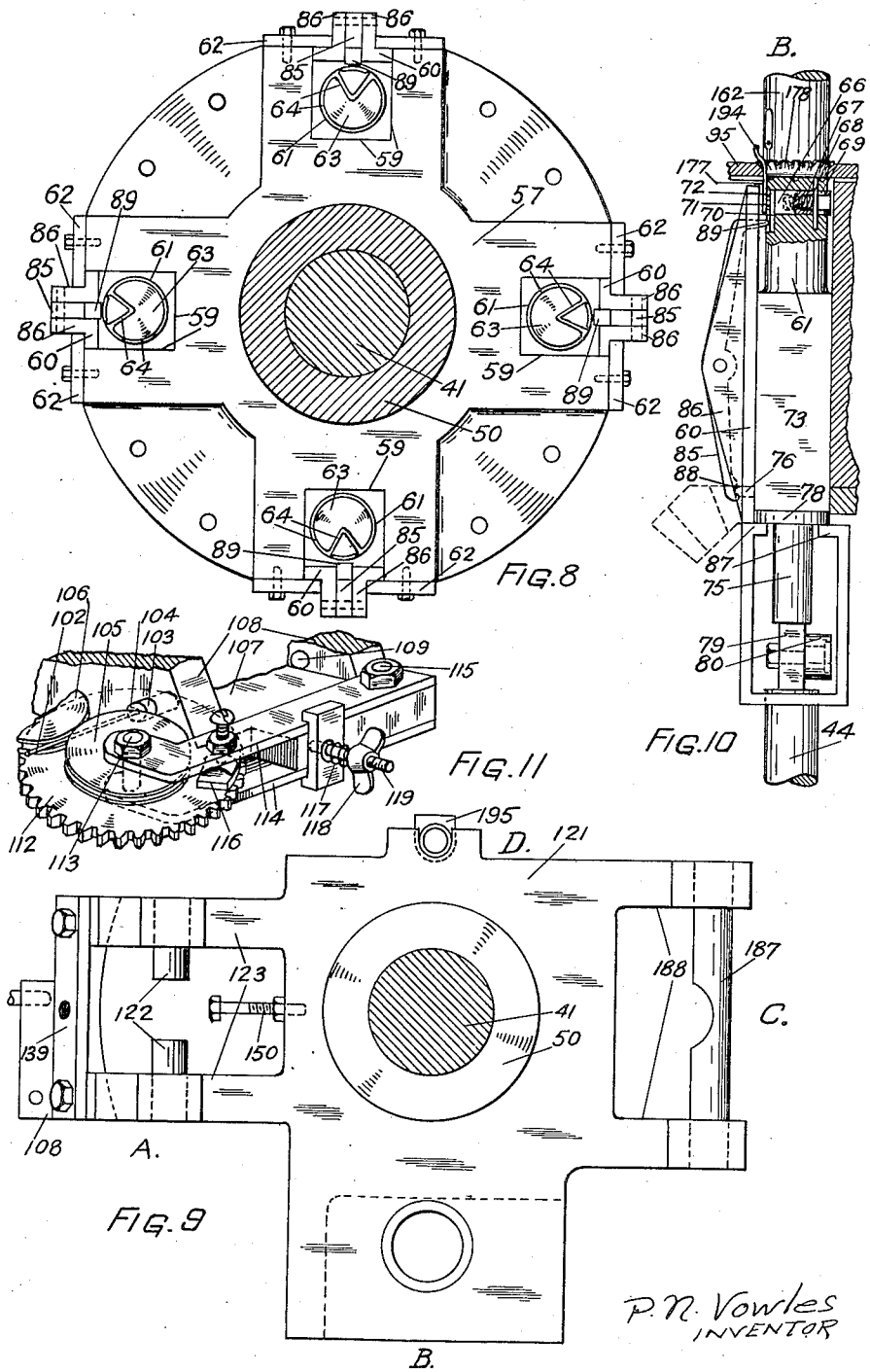

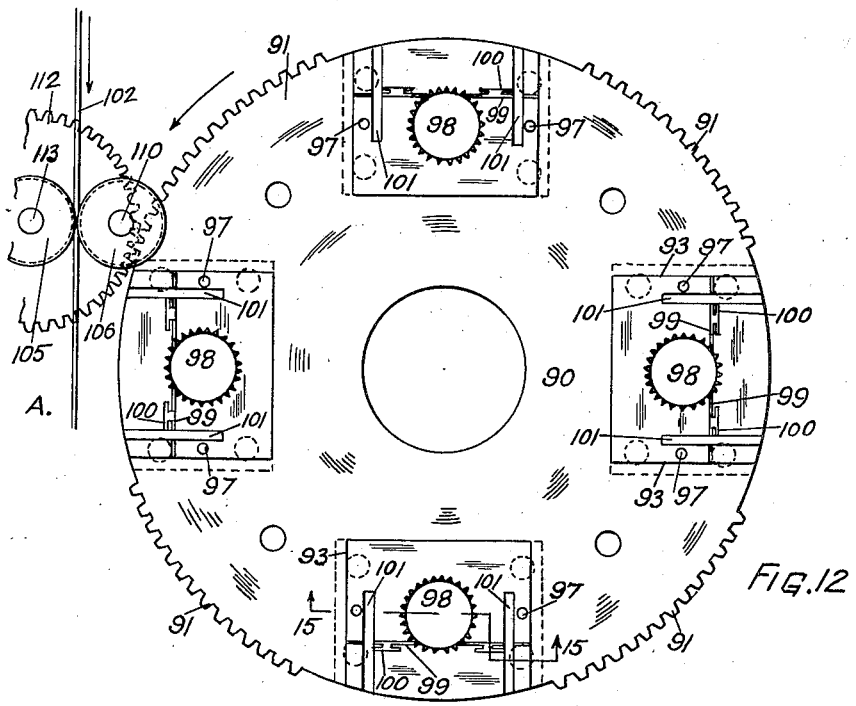
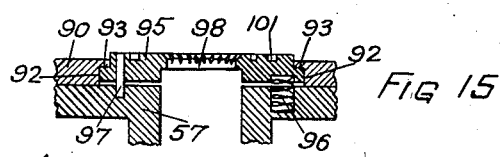
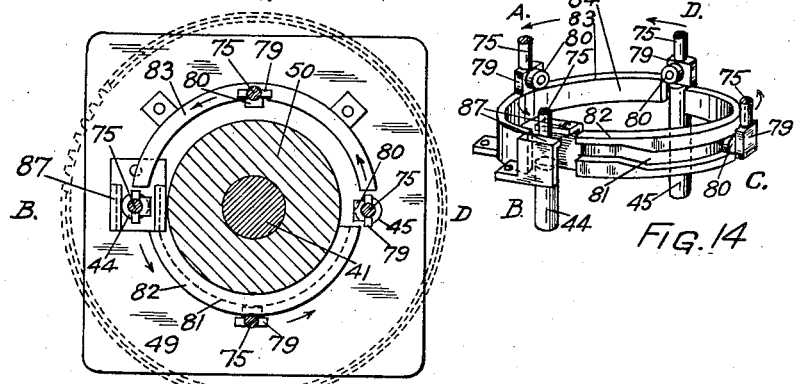

Jan. 26, 1937. P. N. VOWLES 2,068,881
MECHANISM FOR SPECIALLY FORMING, AND FOR FITTING RELEASING MEANS
OF WIRE TO, BOTTLE CLOSURE CAPS OF THE CROWN SEAL VARIETY
Filed Dec. 5, 1934 11 Sheets-Sheet 8
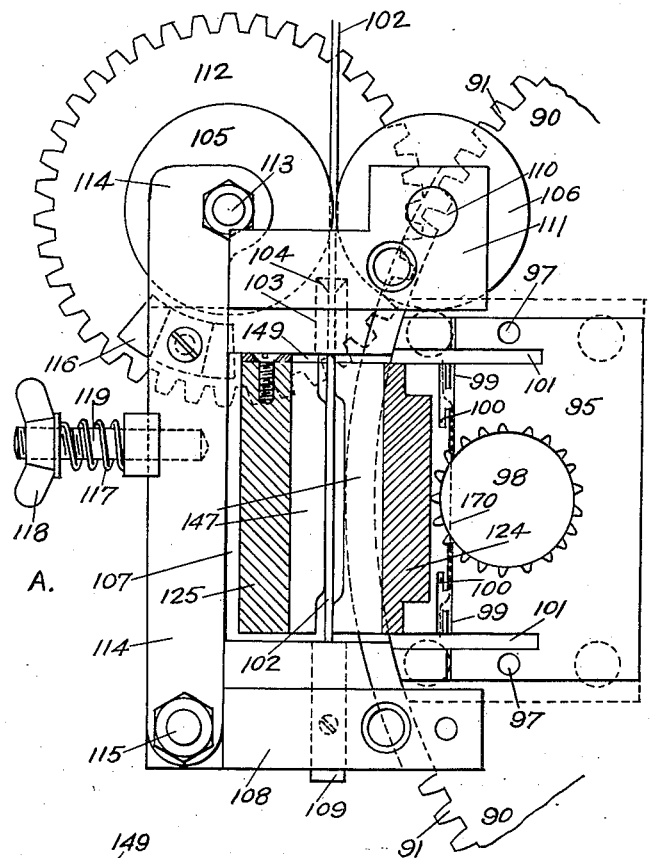
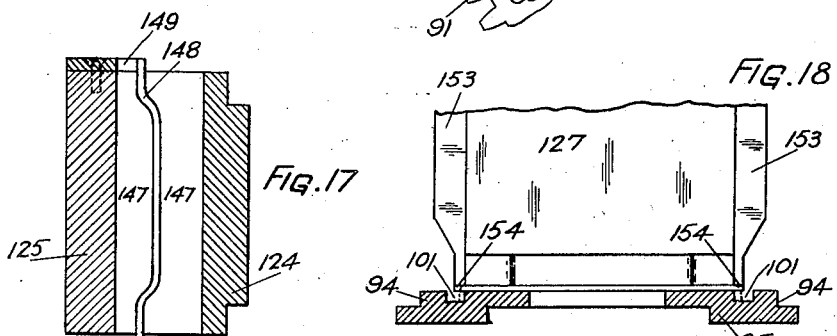
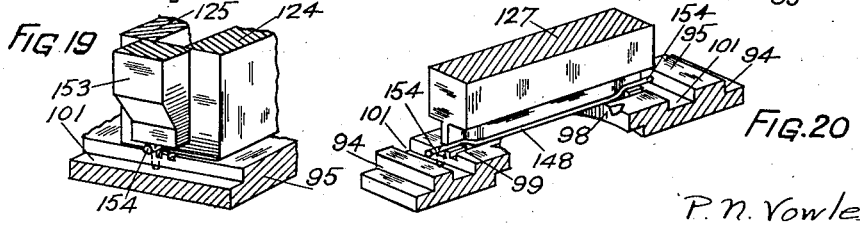
P. N. Vowles
INVENTOR
By Glascock Downing & Seebold
ATTYS.

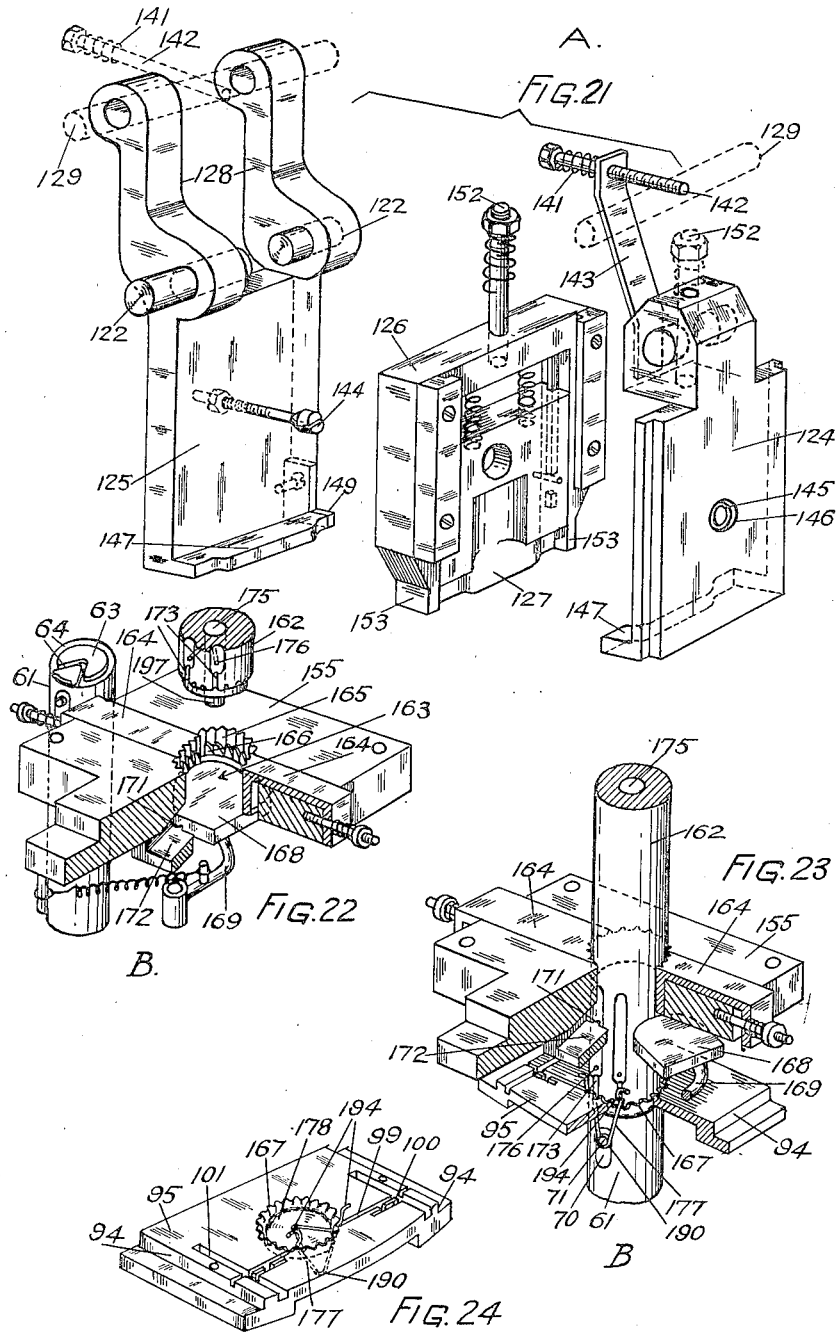

Jan. 26, 1937.   P. N. VOWLES   2,068,881
MECHANISM FOR SPECIALLY FORMING, AND FOR FITTING RELEASING MEANS
OF WIRE TO, BOTTLE CLOSURE CAPS OF THE CROWN SEAL VARIETY
Filed Dec. 5, 1934    11 Sheets-Sheet 10
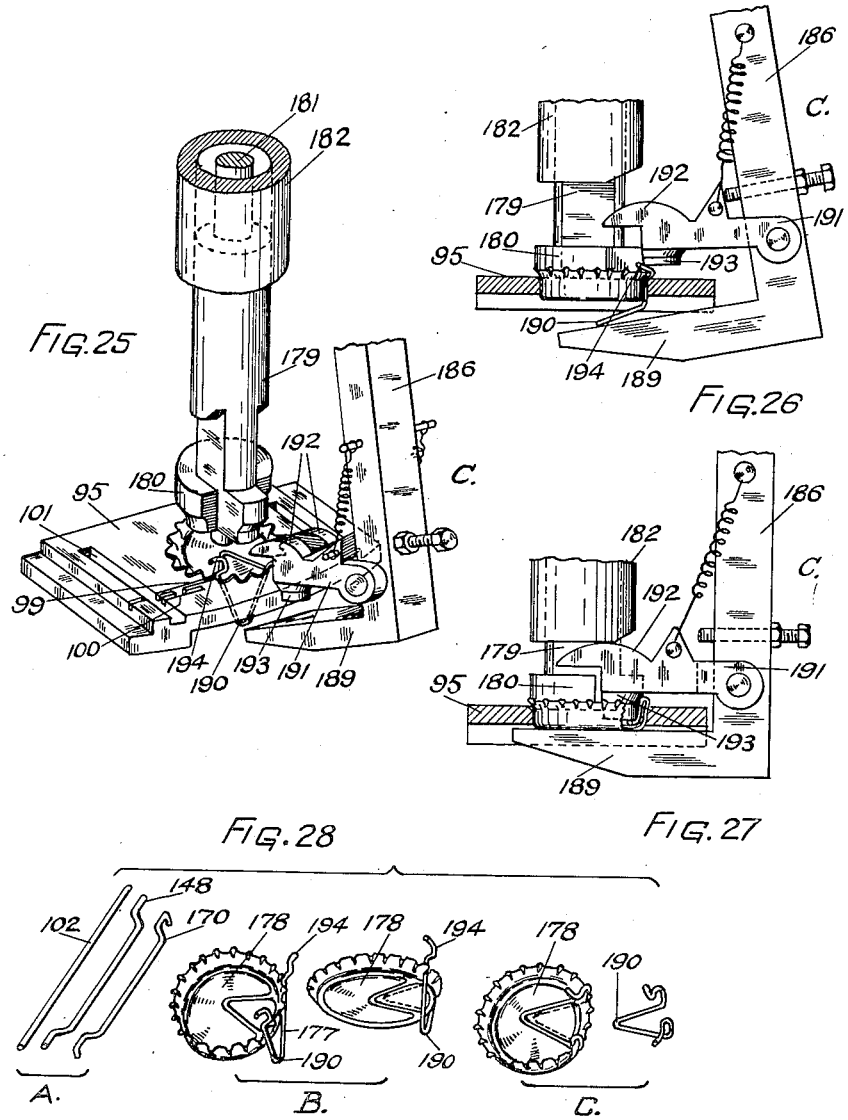

Patented Jan. 26, 1937

2,068,881

UNITED STATES PATENT OFFICE 2,068,881

MECHANISM FOR SPECIALLY FORMING, AND FOR FITTING RELEASING MEANS OF WIRE TO, BOTTLE CLOSURE CAPS OF THE CROWN SEAL VARIETY

Philip Norton Vowles, Croydon, near Sydney, Australia, assignor to William John Smith, Point Piper, near Sydney, Australia Application December 5, 1934, Serial No. 756,156
In Australia December 8, 1933

12 Claims. (Cl. 140—94)

This invention relates to mechanism for specially forming, and for fitting releasing means of wire to, bottle closure caps of the "crown" seal variety.

A mechanism according to the invention is entirely automatic in operation and is designed to rapidly deal with bottle closure caps or "crown" seals in large quantities, and is particularly adapted to fashion sunken or indented portions and ridges and grooves of bottle closure caps and to form bend and fit to each cap a snugly nested loop-like formation of wire which constitutes the bottle cap releasing means, such bottle closure caps and wire releasing means therefor being substantially the same as described and illustrated by the complete specifications and drawings which formed the basis of application for Letters Patent in the United States of America filed on the 29th of March 1933 under Serial Number 663,412 and in the name of Edwin Ralph Rossiter which has matured into Patent No. 1,980,094, of November 6, 1934.

The primary object of the invention is to provide a machine capable of economically forming on a commercial scale bottle closure caps each with associated snugly nested loop-like wire releasing means as last referred to.

An apparatus according to the invention includes means for suitably notching the gofferings of each bottle closure cap to snugly receive within them portions of the said loop-like wire releasing means.

Associated with the apparatus is a feed chute with which are incorporated special means for ensuring a regular feed of bottle caps to the first operating die.

An apparatus according to the present invention also embodies special means for ejecting from it the finished bottle closure cap or "crown" seal together of course with its associated loop-like wire releasing means.

The various operations are automatically carried out in such order that the wire releasing means are partly formed and then associated with the bottle closure cap for complete forming simultaneously with the operations of specially forming the said bottle closure cap. The said operations are carried out in series at a number of different operating locations of the machine that will more fully be described later herein in sequence and will be referred to as station "A", station "B", station, "C" and station "D".

Briefly stated, the sequence of operations so carried out is as follows:—

At station "A" the wire of which the bottle cap releasing means is formed is first fed in predetermined unbroken lengths between a combination of wire forming and cutting means and is there then cut and partly formed.

At station "B" a bottle cap is fed into a special locating die and is forced therethrough by a punch and notched by a notching die (in association with corresponding notching grooves of the said punch) to receive the partly formed wire which at this juncture lies partly formed beneath upon a die plate. The cap is then specially formed between forming punches, and then associated with the said partly formed wire during which process the wire is further fashioned into a looped formation.

At station "C" the bottle cap and its associated looped wire are operated upon by a group of special wire forming dies to bend the loop and ends of the wire in required fashion so as to completely form and securely attach the said wire to the bottle cap and press the said wire snugly into the bottle cap indentation and recesses formed to receive such wire.

At station "D" the completed bottle cap is loosened from its die plate and ejected therefrom into a container or the like.

But in order that the invention may be clearly understood, reference will now be made to the accompanying drawings wherein like reference numerals refer to like parts throughout the various views, such drawings illustrating a machine according to a preferred embodiment of the invention:—

Figure 4 is a plan view of an upper cross head fitting for holding forming punches and other parts.

Figure 5 is a partial vertical sectional view 5—5 of Figure 2 showing the mechanism of the operating stations "B" and "D" of the machine.

Figure 6 is a full size fragmentary sectional view showing details of a wire forming die at operating station "A".

Figure 7 is a vertical sectional view on a line 7—7 of Figure 2 showing details of the base of the machine and parts housed therein.

Figure 8 is a plan view drawn to a scale of half full size of a rotatable turret in which are carried lower forming punches.

Figure 9 is a plan view drawn to a scale of half full size of a die carrying head for holding some of the upper forming dies.

Figure 10 is an elevational detail view serving to illustrate the nature of one of the forming operations carried out at operating station "B".

Figure 11 is a perspective view of levers for carrying one of the wire feed rollers.

Figure 12 is a plan view drawn to a scale of half full size showing a die carrying plate which is adapted to be attached to the said rotatable turret.

Figure 13 is a cross sectional view on a line 13—13 of Figure 1 to a scale of a quarter full size showing in plan cam tracks for operating and controlling lower forming punches Figure 14 is a perspective view showing the cam tracks in Figure 13.

Figure 15 is a cross sectional view on a line 15—15 of Figure 12 drawn to a scale of half full size through one of the dies carried by the die carrying plate.

Figure 16 is a full size fragmentary plan view of detached parts of the wire forming station "A" with the jaws of the forming dies shown in section.

Figures 17, 18, 19 and 20 are detail views partly elevational and partly perspective illustrating various stages in the operation of wire forming dies at station "A".

Figure 21 is a perspective view of partly dismantled units comprising the wire forming die at station "A".

Figures 22 and 23 are partly sectional and partly perspective views showing details of stages in the forming operations carried out at station "B".

Figure 24 is a perspective view of a detached die, carrying a formed bottle closure cap and a partly formed wire to be associated therewith according to the invention.

Figures 25, 26 and 27 are detail elevational and perspective views of stages in the complete forming operations carried out at station "C".

Figure 28, by its several bracketed perspective views of bottle closure caps and wires, illustrates clearly the results of successive stages of the forming work carried out at the stations "A", "B", and "C".

Figure 29:
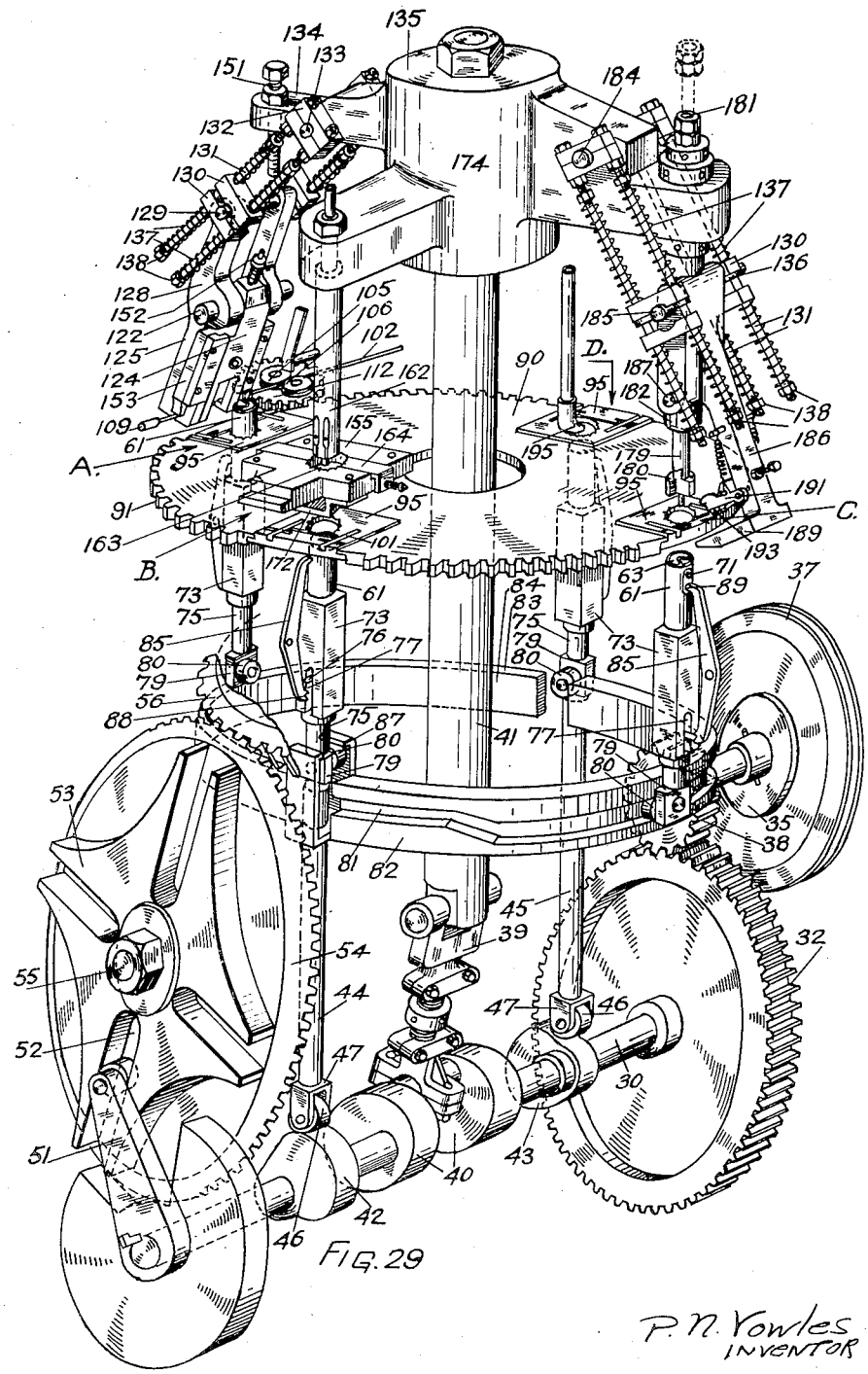

Figure 29 is a diagrammatic view of assembled parts of a machine according to the invention when stripped of any supporting framework.

Referring then to the said drawings, a rotatable crank shaft 30 housed in suitable bearings in the base 31 has attached thereto at one end and outwardly of one of the bearings a spur gear 32 which meshes with a gear pinion 33 fixed to a rotatable shaft 34 housed in suitable bearings associated with the base 31.

Fixed upon the shaft 34 is a clutch member 35 co-operating with a loose clutch member 36 so as to be frictionally driven by a grooved driving pulley 37 by means of the pressure of the spring 38 upon the clutch member 36, driving pulley 37, and so against the fixed member 35.

The driving pulley 37 so mounted is enabled to slip so as to prevent damage to the mechanism should a bottle closure cap or wire become misplaced in the dies or should disarrangement of the units or other parts occur.

Associated with the crank shaft 30 is a connecting rod 39 which is connected to the crank 40 of the said crank shaft and to the lower end of a vertical rod 41 to transmit thereto a reciprocating motion when the crank shaft 30 and crank 40 are revolved by the driving pulley 37.

Fixed inwardly of and adjacent to the bearings of the crankshaft 30 are lifting cams 42 and 43 which when revolved coincidentally with the crankshaft 30 function to raise and lower push rods 44 and 45.

The lower extremity of each push rod 44 and 45 is fitted with a roller 46 rotatably fitted within a roller bearing block 47 which in turn is adapted to move within a guideway 48, all in manner to effectually prevent rotational movements of the push rods 44 and 45.

The upper end of each of the said push rods 44 and 45 extends upwardly through the base 31 and through the base 49 of a central hollow pillar 50.

Each said push rod is adapted to successively lift each one of four lower forming punches (to be later more particularly referred to) only as each said punch successively arrives at operating stations "B" and "D" as it is being carried around by a turret head (the latter also more particularly referred to later).

Fixed to that end of the crank shaft 30 remote from the spur gear 32, and outwardly of the bearing for such remote crank shaft end, is the operating arm 51 of a well known Geneva cross movement (see Figures 2 and 29) which arm 51 is adapted to successively engage slots 52 of the four-slot Geneva cross 53 formed integrally with a bevel gear 54 rotatably mounted upon the stub spindle 55 suitably mounted in the base 31. The bevel gear 54 meshes with another bevel gear 56 of exactly similar dimensions and having the same number of teeth, such bevel gear 56 being secured to and beneath a turret head 57 which is rotatable about the central hollow pillar 50. Between the bevel gear 56 and the base 49 of the central hollow pillar 50 is a ball thrust bearing 58 of ample dimensions to carry the thrust and weight of the turret and its associated parts.

The vertical reciprocable rod 41 passes upwardly and in a neat fitting manner entirely through the central hollow pillar 50. The turret head 57 is provided with rectangularly formed slots 59 (see Figure 8) in each of which is slidably housed by means of guide plates 62 a slider 60 (all sliders being precisely similarly formed) and a lower forming punch 61 (see Figure 3) which functions to assist in forming a bottle cap and to draw wire in a looped fashion through notches previously cut by a notching die in the bottle cap.

Figure 3:
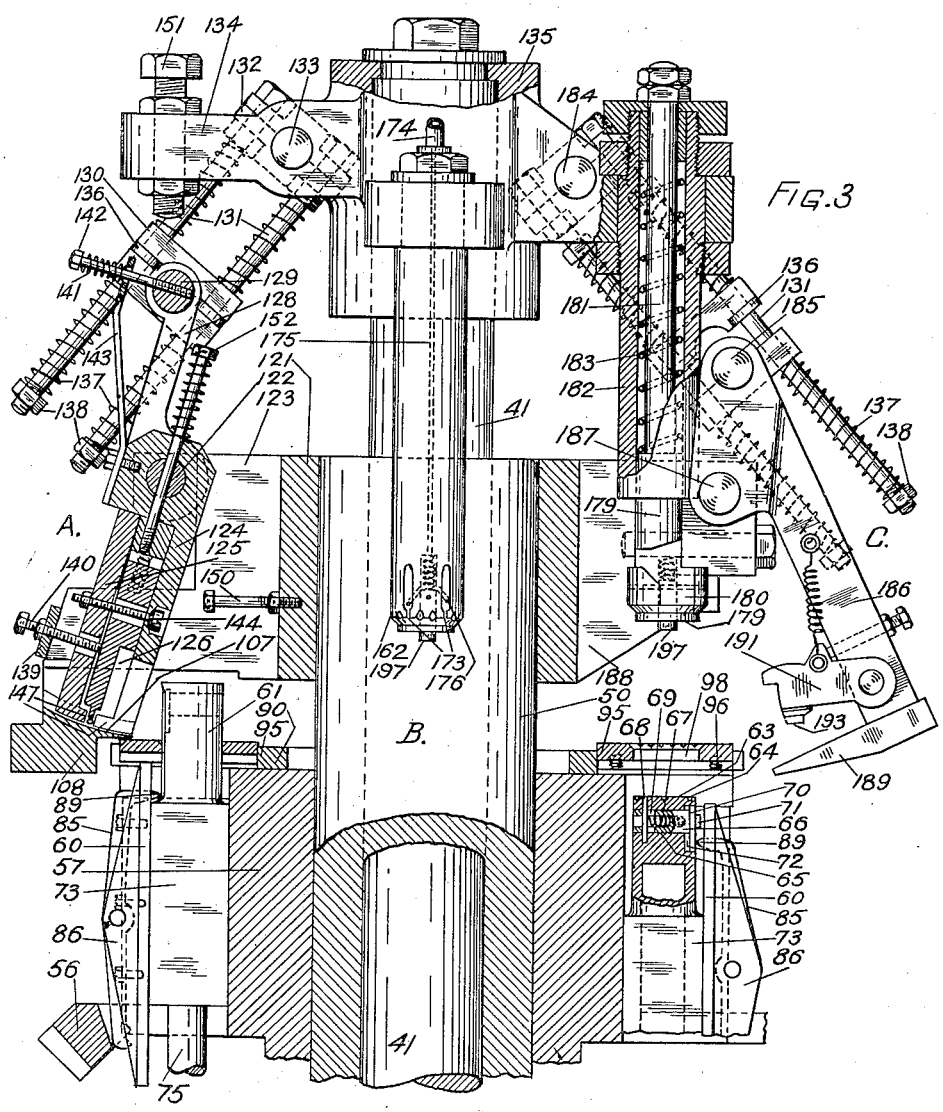
Figure 3 is a partial vertical sectional view 3—3 of Figure 1 showing the mechanism of the operating stations "A" and "C" of the machine.

The upper faces 63 of the forming punches are provided with forming grooves 64 (see Figures 3, 5, and 8).

Immediately below the forming faces 63 of each one of the punches 61 is a transversely formed opening 65 in which is slidably fitted a hollow shank portion 66 of a catch 71 in which hollow shank portion 66 is fitted a tension spring 67.

A pin 68 passes through the hollow shank portion 66 and retains the spring 67 therein. An elongated slot 69 in the hollow shank portion 66 provides for restricted inward movement of the latter in association with the pin 68.

A substantially oblong plate 70 of ample dimension having a wire forming looping lug 71 or catch is attached to or integral with the hollow shank portion 66 and is capable of a slidable movement in a snug recess 72 in the punch 61 (see Figure 3.)

The lower portion 73 of each punch 61 is squared to slide snugly in a slot 59 in the turret 57 (see Figures 3, 5, 10 and 29). The said squared portion 73 is hollowed to receive a spring 74 which operates downwardly upon the movable plunger 75 through which latter is secured a projecting pin 76 which is free to move upwardly or downwardly with the said plunger 75 through elongated slot 77 in the squared portion 73 of the forming punch. The screwed gland nut 78 prevents detachment of the plunger 75 which is thus maintained in association with the punches 61.

The lower end of each plunger 75 is provided with a rectangular block 79 on which is firmly mounted a rotatable roller 80 (see Figures 1, 5, 10 and 29).

The said rollers 80 are engaged by the groove 81 of the cam track 82 which latter is of circular configuration and extends from station "B" to station "D" (see Figures 1, 13, 14, and 29).

The blocks 79 on which the rollers 80 are fitted are adapted to ride upon the upper edge 83 of a circular edge track 84 (see Figures 13, 14 and 29).

The push rods 44 and 45 are operated by the cams 42 and 43 and function to elevate or lower the punches 61 for performance of their forming operations when elevated, and also to enable the rollers 80 and blocks 79 to engage with the cam track groove 81 or with the edge 83 of the edge track 84.

Lifting of lower forming punches takes place only at stations "B" and "D" while at stations "A" and "C" an edge track 84 and cam track 82 respectively and in succession function.

Slidably housed in the same slots 59 in the turret 57 as are the squared lower punch portions 73 are the sliders 60 before mentioned which carry the rockable levers 85 each pivotally mounted between a pair of lugs 86 (see Figures 3, 5, 8 and 10).

The sliders 60 are each in turn engaged by an abutment 87 mounted at station "B" between the junction of the cam track 82 and the edge track 84 (see particularly Figures 10, 13 and 14) and rest upon such abutment while the cam 42 on the crankshaft 30 permits lowering of the push rod 44 and with it the plunger 75 when the pin 76 engages the rockable lever 85 and said pin 76 finally enters the notch 88 formed in the lower end of the said rockable lever when the upper bent end 89 then engages and depresses the elongated plate 70 to actuate the hollow catch 66 and its wire loop forming lug 71 (see particularly Figures 5 and 10), the said spring actuated catches 66 of the said punches 61 being depressed in succession at station "B" to release the partly formed looped portion of the wire (as seen in Figure 23) from the looping lug 71 in readiness for the next successive operation, so that at station "C" the said wire loop may be bent inwardly, in manner which will appear, to lie flush with the upper surface of a bottle cap.

Fixed upon the upper horizontal surface of the turret 57 is a die carrying plate 90 (Figure 12) whose edge is formed into four sets (each of a pre-determined and equivalent number) of gear teeth 91 with equal blanks dividing the said sets of gear teeth.

Slots 92 having rebated edges 93 (see Figures 12 and 15) are formed in the die-carrying plate 90 to receive the rebated edges 94 (Figures 20 and 24) of the dies 95 which are each cushioned by a spring 96 (see Figure 15) so as to be slightly depressible during forming operations to prevent liability of breaking or bending of the die by relieving it of abnormal shock due to any pressure of and sudden contact with the upper forming punches to be later referred to.

The dies 95 are retained in the die plate 90 by dowel pins 97 situated at or near their rebated edges 94.

The dies 95 have each an opening 98 formed therethrough (see Figure 12), such opening being shaped to the configuration of and to receive snugly resting therein a crown seal or bottle closure cap to be operated upon as required by the various forming operations for which the mechanism is designed to be utilized.

Transversely of each die 95 and near the front edge of its opening 98 are grooves 99 and 100, and near the rebated edges of each die 95 are grooves 101 all for the purpose of wire bending and forming operations to be later described.

The upper part of the machine will now be more particularly described with reference to the four forming stations before referred to and which stations will be found distinctly lettered in the drawings "A", "B", "C" and "D".

Referring first then to station "A" and particularly at this juncture to Figures 3, 7, 11, 12, 16 and 29 of the drawings, the wire 102 drawn from a reel or other supply in convenient location passes between feed rollers 105 and 106 then through an opening in a directing throat piece 103 which has a tapered lead-in opening 104 and then transversely across the arcuately shaped face 107 of a bridge 108 and finally is arrested by the adjustable stop 109.

The roller 106 is rotatable upon the pin 110 fixed in the block 111 mounted upon the bridge 108. The other roller 105 is fixed to the gear wheel 112 rotatable upon a pin 113 which is carried by a pair of levers 114 the latter swingable upon a pin 115 attached conveniently to the bridge 108. Above the gear wheel 112 is an adjustable spring tensioned brake shoe 116 which functions upon its adjustment to permit only the requisite amount of rotational movement of the said gear wheel 112. The swingable levers 114 are adapted to function to impart the requisite feeding pressure of the roller 104 upon the wire 102 and against the other roller 106, their adjustment being effected by manipulation of the adjustable tension spring 117 by means of the wing nut 118 threaded upon the stud 119 mounted in the bridge 108.

A series of rollers 120 (see Figure 1) may be employed in association with the feed rollers 104 and 106 to straighten the wire 102 prior to its being fed into the machine.

Figure 1:
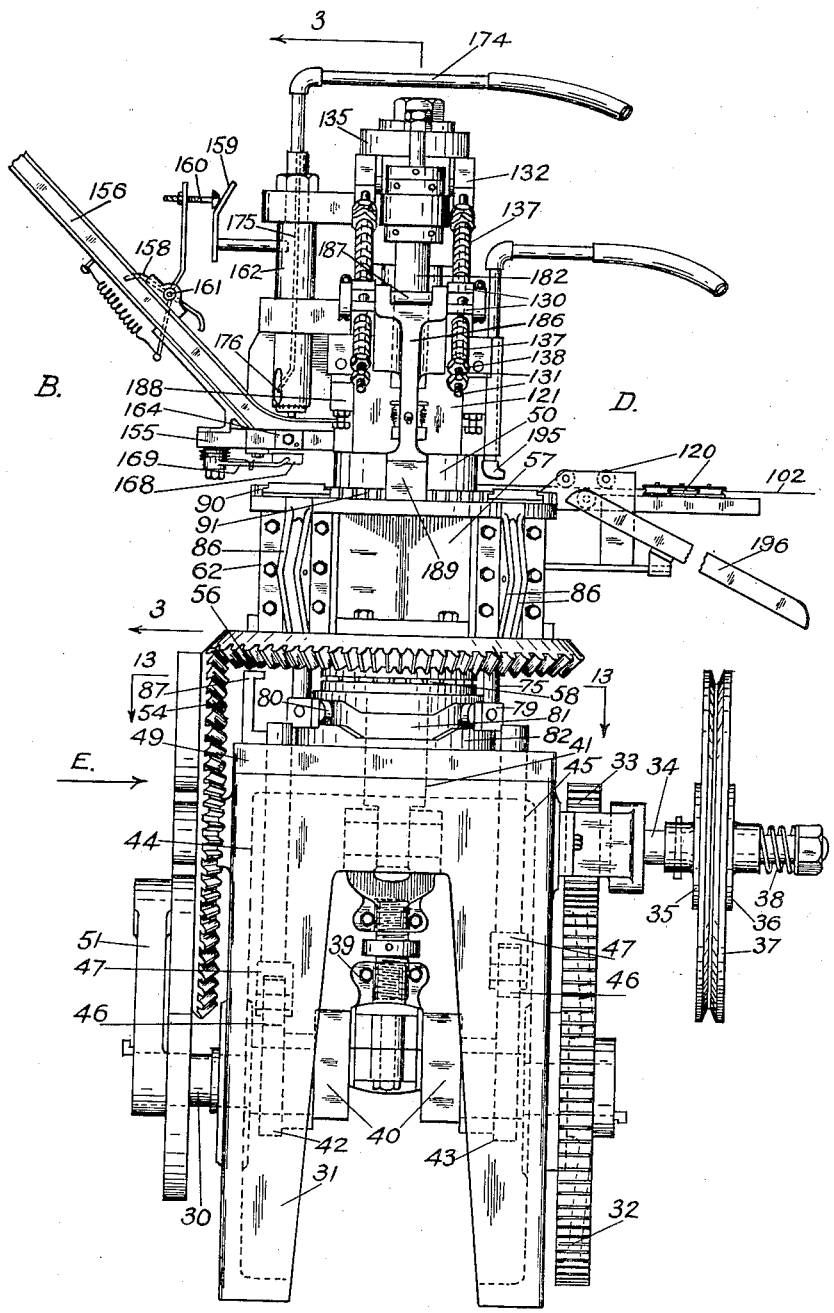
Figure 1 is a front elevational view of a machine according to the invention, the view being drawn to a scale of a quarter full size.

Mounted upon the upper end of the central pillar is a die carrying head 121 (see Figures 1, 3, and 5). At station "A" the head 121 carries, upon the pivots 122 and between the cheeks 123 (see also Figure 9), a swingable wire forming die comprised by the inner and outer forming jaws 124 and 125 (see Figures 3, 6, and 21) together with a wire bending slide 126 associated with a stripper 127 (see Figures 6, 18, 20 and 21). The outer forming jaw 125 is provided with upwardly extending arms 128 which carry a pin 129. The said pin 129 engages with the two pairs of blocks 130 which are slidable on the two pairs of spring actuated toggle levers or rods 131. The upper ends of the toggle levers 131 are provided with blocks 132 which are rotatably fitted about a pivot 133 fixed in the arm 134 of a cross head 135 which is secured to the upper end of the reciprocable rod 41. (See particularly Figures 2, 3 and 29).

The toggle levers 131 are provided with fixed collars 136 against which slidable blocks 130 come to rest by the tension of the springs 137 (see Figure 29) which springs are adjusted by means of threaded nuts 138 to ensure their requisite amount of compression to bring about the required inward pressure upon each inward swing for effective operation of the respective forming dies to carry out their respective and necessary forming operations for which they are provided Such springs 137 furthermore function as resilient means whereby damage to forming dies or associated elements is ensured against should any clogging occur.

The forming operations carried out at this station "A" are effected by reciprocation of the vertical rod 41 and with it the cross head 135.

A bar 139 (Figures 2, 3, 6 and 9) carried by the cheeks 123 of the die head 121 is provided with an adjustable stop pin 140 to limit the outward swing of the inner wire forming jaw 124 (and with it the stripper 127) by its abutment with the said stop pin 140 as the vertical rod 41 and cross head 135 rise to their fullest extent and by reason of the upward pull of the toggle levers 131 thus brought about. When the inner wire forming jaw 124 is thus brought to rest by the stop pin 140 the outer jaw is still capable of a slightly further outward movement away from the inner jaw by reason of the pressure exerted by a helical spring 141 under compression against the arm 143 attached to the inner jaw 124, such spring 141 being located on the stud 142 carried by the pin 129 (see particularly Figure 3).

Limitation of this last-mentioned movement is provided for by abutment of the head of the adjustable stop screw 144 (attached to the outer jaw 125) against the shoulder 145 in the recess 146 in the inner jaw 124 (see Figures 3, 6 and 9 and also detail view Figure 21).

The bending portions 147 of the jaws are shaped to the desired configuration of the wire 148 as shown for example at Figure 28. The wire is bent to such configuration by closure of the jaws brought about by lowering of the cross head 135 by the vertical rod 41. Thus, the wire 102 is first cut by the cutter 149 (see detail view Figure 21) and is then bent to the configuration indicated by numeral 148 at Figure 28 upon abutment of the inner forming jaw 124 with the stop pin 150 (attached to the die head 121) by the inward swinging of the dies, after which the striker 151 on the cross head 135 engages with the striker pin 152 of the bending slide 126 whose sides 153 (see detail view Figure 21) are adapted to bend the ends 154 (see Figure 18) of the wire 148 into the cross grooves 101 of the die 95, thus forming the wire configuration indicated by numeral 148 at Figure 28 into the wire configuration indicated by the numeral 170 at Figure 28.

Continued downward movement of the bending slide 126 operates the spring controlled stripper 127 which strips or pushes the bent wire 170 from between the bending portions 147 of the jaws 124 and 125 to thus firmly embed the said bent wire 170 in the grooves 99 and 100 transversely of the die 95. The bridge 108 mounted as beforementioned upon the cheeks 123 of the die head 121, has its arcuately formed inner face 107 so formed as to enable the jaws 124 and 125 of the wire forming die to swing in close relationship with it during wire forming operations.

During this last described wire bending and forming operation a lower forming punch 61 is automatically left at rest at the wire bending station "A" projected through the die 95 by resting upon the edge track 84. (See Figure 6.)

After completion at station "A" of the wire bending and forming operation just described and after the bent wire 148 has been embedded in the grooves 99 and 100 of the die 95, the operating arm 51 of the Geneva cross 53 partially rotates the latter through a quarter of a revolution to bring the said die 95 to station "B" beneath a locating die 155 and simultaneously the cross head 135 rises to its fullest extent.

Above the locating die 155 is an inclined feed chute 156 which may at its upper extremity be connected to and associated with any well known type of sorting feed hopper (not shown in the drawings).

Down through the said feed chute, bottle caps 157 (see Figure 5) gravitate and are fed singly to the locating die 155. Such bottle caps 157 leave the sorting hopper in inverted positions and are singly permitted to reach the locating die 155 by the operation of a spring-controlled escapement lever 158 which is caused to function by co-operating movements of the an inclined track 159 and a pin 160, the spring controlled escapement lever 158 being rockable about a pivot 161 fitted in suitable bearings on the chute 156.

The said inclined track 159 is attached to an upper forming punch 162 which is slidably guided in the die head 121 which latter is secured in the cross head 135 and when raised and lowered thereby the escapement 158 is rocked to feed by gravitation the caps 157 singly and at predetermined intervals of time to the locating die 155.

The upper forming punch 162 has its lower end of suitable configuration to tightly receive over it an inverted bottle cap.

Each bottle cap 157, as yet unformed by the machine according to the invention, falls into and is snugly received by the opening 163 (see Figures 5, 22 and 29) in the locating die 155 and is there located correctly by a pair of slidable spring controlled locating shoes 164 (see particularly Figures 22 and 23) which, together with the opening 163 in the die 155, are formed on their inner faces with the locating grooves 165 which have saw toothed locating projections 166 which are adapted to engage with the gofferings or crimped edges 167 of the cap 157 to ensure correct location of the latter.

It will be seen that as each cap 157 gravitates to the bottom of the opening 163 of the locating die 155 it passes between the shoes 164 which are adjusted to the requisite size of opening for easy passage of the said cap and the latter is then brought to rest upon a levelling or steadying plate 168 controlled by a spring actuated arm 169.

Such levelling or steadying of each cap before it enters the locating die 155 is necessary to prevent side tilting of the cap which would cause the latter to be rendered useless by becoming crushed and distorted during punching and forming operations besides tending to simultaneously render the machine inoperative.

As the turret head 57 revolves and the crosshead 135 rises the lower forming punch 61 projecting through the die 95 which carries in it a partly formed wire 170 fashioned as previously described is brought to station "B", and the said punch 61 forces out of its circular path the spring controlled steadying plate 168, so that the cap 157 which has previously been correctly located in the die 163 may rest instead upon the upper face of the said lower forming punch 61 which momentarily remains stationary. When the upper forming punch 162 has descended upon the lower stationary punch 61 with the cap 157 therebetween and when the said cap 157 has been thus formed by the machine according to the objective of the invention, movement of the cam 42 takes place to permit descent of the push rod 44 and of the said punch 61 at the same speed as that of the descending upper forming punch 162 and as the cap 157 still imprisoned between the forming faces of the upper and lower punches 61 and 162 descends and passes through the locating die 155 it is notched by a pair of projections as 171 of a notching die 172.

The pair of projections 171 (one only of the pair seen clearly in Figures 22 and 23) function co-incidentally with the pair of grooves 173 formed in the punch 162, the lower edges of such grooves 173 forming with the said projections 171 the means whereby the requisite small pieces of metal are cut away in desired locations from the edge of the cap 157.

The particles of metal detached by the projections 171 are blown away (to prevent clogging of the mechanism) by compressed air which is led to an inlet pipe 174 through a passage 175 which communicates with orifices 176 (see Figures 3 and 5 particularly).

The punches 162 and 61 co-incidentally now further descend until the cap 157 is firmly embedded in die 95 located at station "B" and at that instant the squared portion 73 of the forming punch 61 rests upon the abutment 87 (located between the junction of the cam track 82 and the edge track 84) when the maximum pressure or force is exerted by the upper forming punch 162 so that projections upon its face, of configuration corresponding or co-registering with grooves formed from the face of the lower forming punch 61, together form the cap 157 with sunken or indented portions and ridges and grooves in required manner.

Simultaneously with the descent of the lower forming punch 61 through the die 95 the catch or looping lug 71 (see particularly Figure 23) engages with the wire 170 to draw it downwardly in a looped fashion, after which the cam 42 moves so as to permit the plunger 75 to rapidly descend within the stationary punch 61 ( see Figures 3 and 5) and simultaneously the rockable lever 85 carried by the stationary slider 60 is rocked by the pin 76 as it moves downwardly to at the end of its downward travel engage in the notch 88 to move inwardly the upper bent end 89 to depress the hollow shank portion 66 and catch or looping lug 71 away from engagement with the looped wire 177 (see Figure 10).

As the turret head 57 now again is partially revolved and the cross head 135 again rises, the cap 178 (formed with requisite sunken or indented portions and ridges and grooves) and the looped wire 177 are together brought to station "C" the rollers 80 of the plungers 75 being each in turn engaged, prior to arrival at station "C", in the groove 81 of the tracked cam 82 so as to draw further downwardly (when located at station "C") each lower forming punch 61 clearly away from beneath the now formed cap 178.

When the partial revolution of the turret head 57 has ceased, that upper forming punch 179 at station "C" descends and its foot portion 180 enters the formed cap 178 while its shank portion 181 telescopes within the hollow sleeve 182 attached to the cross head 135. Within the sleeve 182 is a helical spring 183 which is compressed upon downward movement of the shank portion 181 so that its stored energy may subsequently cause the shank 181 to be lifted upwardly and forced outwardly from its sleeve 182 upon the completion of the forming operation.

Figure 2:
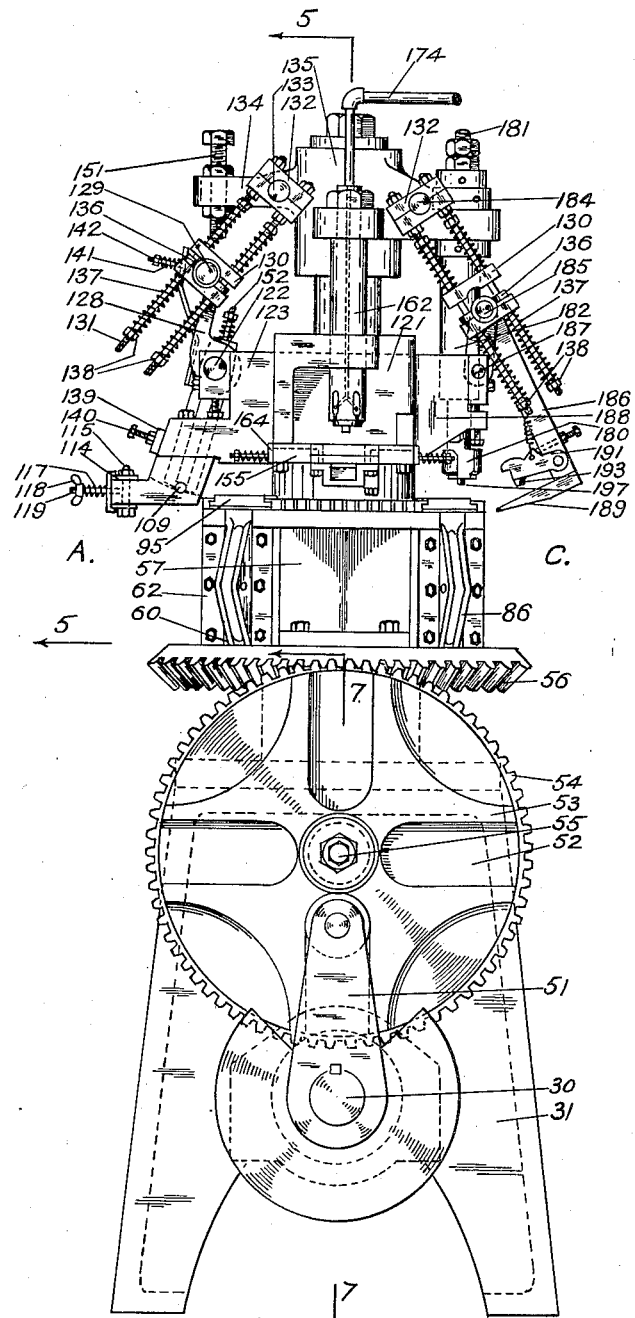
Figure 2 is a side view E of Figure 1 drawn to the same scale.

During descent of the said upper forming punch 179, pairs of toggle levers 131 similar to those at station "A" swing upon the pivot 184 in the cross head 135 and the pivot 185 in the upper extremity of a bending arm 186 which latter in turn is swingable upon the pivot 187 in the cheeks 188 of the die head 121 (see particularly Figures 2, 3, and 29).

As the cross head 135 again descends the bending arm 186 swings inwardly and its bending foot 189 bends the loop portion 190 of the looped wire 177 (see particularly Figures 25, 26 and 27) until the said foot 189 has closely passed beneath the formed cap 178 to bend the loop portion 190 closely against and nested snugly in the formed sunken or indented outer surface of the said cap 178.

Pivotally mounted in a suitable location on the bending arm 186 adjacent and above its bending foot 189 is a spring controlled wire bending lever 191 which has a bifurcated end 192 beneath which are depending lugs 193 which function to bend the upstanding ends 194 of the looped wire 177 over the goffered edge and inwardly of the formed cap 178 as the arm 186 moves inwardly by reason of the action of the toggle levers 131.

When the bending arm 186 has moved inwardly to its fullest extent the sleeve 182 descends upon and engages with the bifurcated end 192 of the wire bending lever 191 to press downwardly the depending lugs 193 upon the ends 194 of the looped wire 177 to locate the said ends 194 of the said looped wire 177 snugly upon and within the formed cap 178 thus completing the wire forming operation.

The punch 179 and bending arm 186 are now drawn away from the formed cap 178 and the turret head 57 is again partially revolved through a quarter of a revolution to transfer the formed cap 178 still in its die to station "D" where the lower punch 61 beneath the cap 178 is pushed upwardly by upward movement of the cam 43 whereupon an automatically and intermittently functioning and timed air blast from the air nozzle 195 (see particularly Figures 1, 5, and 29) ejects the formed cap from the machine through or upon a chute 196 of any convenient design leading to any approved location.

Spring controlled ejector pins 197 (see Figures 2 and 3) are provided in the upper forming punches 162 and 179 to eject or free therefrom the formed caps 178 should the latter tend to remain thereupon or stick as the said punches rise after completing their respective forming operations.

It will of course be understood that in general the invention as described is subject to modifications in constructional details and design and arrangement of parts within the scope of the appended claims, and furthermore that within such claims any suitable and approved mechanical equivalent or equivalents in lieu of any one or more of the mechanical integers referred to in the specification may be substituted therefor.

What I do claim is:—

1. An automatic mechanism for reforming bottle closure caps and fitting releasing wires thereto comprising means to cut and partly form wire, means to receive adjacently to each other said partly formed wire and a bottle closure cap and to indent and notch the latter and to fashion the wire into a looped formation, means to snugly nest the loop-like wire formation into the bottle cap indentation and recesses formed for reception of said wire formation, and means to positively eject the indented and wire fitted bottle cap.

2. A mechanism as claimed in claim 1 and which includes means for notching the gofferings of each bottle closure cap to snugly receive within them portions of the said loop-like wire formation.

3. A mechanism as claimed in claim 1 and with which is associated a feed chute equipped with means for ensuring a regular feed of bottle closure caps to the second mentioned means.

4. A mechanism as claimed in claim 1 and with which is associated a feed chute equipped with means for ensuring a regular feed of bottle closure caps to the second mentioned means the means for ensuring a regular feed of bottle closure caps a rockable spring-controlled escapement lever associated with the feed chute and which lever is caused to function by co-operating movements of an inclined track attached to an upper forming punch, substantially as set forth.

5. A mechanism as claimed in claim 1 characterized in that the means for positively ejecting the caps is intermittently operated.

6. A mechanism as claimed in claim 1 wherein the first mentioned means includes a wire directing throat piece, feed rollers for the wire, swingable levers to impart the requisite feeding pressure and adjustment means associated therewith, wire straightening rollers, a swingable wire-forming die comprised by inner and outer forming jaws, a wire bending slide, means for adjustment of the inward pressure upon each inward swing of the forming die, means to limit the outward swing of the inner wire forming jaw, an automatically and intermittently operated wire cutter, a bending slide adapted to bend the ends of the partly formed wire, a spring cushioned die and a spring controlled stripper associated with the before-mentioned wire bending slide and adapted to push or strip the formed wire from between the bending portions of the forming jaws and to embed the said formed wire in a spring-cushioned die.

7. A mechanism as claimed in claim 1 wherein the second mentioned means includes a locating die for a bottle closure cap, a pair of slidable spring-controlled locating shoes adapted to engage with the gofferings of the cap, a spring-controlled steadying plate for the cap, lower and upper cap indenting punches, an arresting abutment for the said lower punch, a die for notching the edge of the cap, compressed air means for blowing away particles of metal detached by the notching die, a wire looping lug associated with the lower punch, and means for automatically disengaging the said wire looping lug from the looped wire.

8. A mechanism as claimed in claim 1 wherein the third mentioned means includes a bending arm having a foot portion adapted to bend the looped portion of the said wire formation beneath and cause it to rest snugly in the indented outer surfaces of the cap, and a spring-controlled wire bending lever having a bifurcated end and depending lugs which function with means to bend the upstanding ends of the looped wire over the goffered edge and inwardly of the formed cap.

9. A mechanism as claimed in claim 1 wherein the fourth mentioned means includes an automatically and intermittently functioning and timed air blast nozzle and a delivery chute.

10. In a mechanism as claimed in claim 1, a crank shaft, a driving gear for the several means comprising a driving shaft and pulley and associated friction drive and gearing to operate said crank shaft, lifting cams associated with the said crank shaft, push rods the lower extremity of each of which latter is fitted with a rotatably fitted roller and a roller bearing block a guideway being provided for said roller bearing block, said push rods being raised and lowered by said crank shaft, lower forming punches adapted to be lifted by the said push rods, a bevel gearing, a Geneva cross movement associated with said bevel gearing and with the said crank shaft, a central hollow pillar, a turret head which is intermittently rotatable about said central hollow pillar, and a vertically reciprocable rod passing upwardly through the central hollow pillar.

11. In a mechanism as claimed in claim 1, a crank shaft, a driving gear for its several means comprising a driving shaft and pulley and associated friction drive and gearing to operate said crank shaft, lifting cams associated with the said crank shaft, push rods, the lower extremity of each of which latter is fitted with a rotatably fitted roller and a roller bearing block, a guide way being provided for said roller bearing block, said push rods being raised and lowered by said crank shaft, lower forming punches adapted to be lifted by the said push rods, a bevel gearing, a Geneva cross movement associated with said bevel gearing and with the said crank shaft, a central hollow pillar, a turret head which is intermittently rotatable about said central hollow pillar, and a vertically reciprocable rod passing upwardly through the central hollow pillar, each lower forming punch having its lower portion squared and hollowed, a spring bearing in said lower portion a movable plunger pushed downwardly by said spring, the lower end of said plunger being provided with a rectangular block and a roller, a circular cam track having a groove, the said roller being adapted to be engaged by said groove, a circular edge track on the upper edge of which said block is adapted to ride.

12. In a mechanism as claimed in claim 1, a crank shaft, a driving gear for the several means comprising a driving shaft and pulley and associated friction drive and gearing to operate said crank shaft, lifting cams associated with the said crank shaft, push rods the lower extremity of each of which latter is fitted with a rotatably fitted roller and a roller bearing block, a guide way being provided for said roller bearing block, said push rods being raised and lowered by said crank shaft, lower forming punches adapted to be lifted by the said push rods, a bevel gearing, a Geneva cross movement associated with said bevel gearing and with the said crank shaft, a central hollow pillar, a turret head which is intermittently rotatable about said central hollow pillar, and a vertically reciprocable rod passing upwardly through the central hollow pillar, a die carrying head on the upper end of said central hollow pillar, a swingable wire forming die carried by said die carrying head, said die comprising inner and outer forming jaws together with a wire bending slide associated with a stripper, spring-actuated toggle levers whose uper ends are provided with blocks for operating said parts of the die, a cross-head secured to the upper end of said vertically reciprocable rod, a pivot fixed in an arm of said cross-head, said blocks being rotatably fitted about said pivot, a pivoted wire bending arm and spring actuated toggle levers disposed opposite the aforesaid toggle levers operating said wire bending arm.

PHILIP NORTON VOWLES.